June 20, 1939.          L. A. CROCKETT          2,162,939
APPARATUS FOR MAINTAINING COMPASS ACCURACY IN MARINE INSTALLATIONS
Filed Jan. 17, 1938
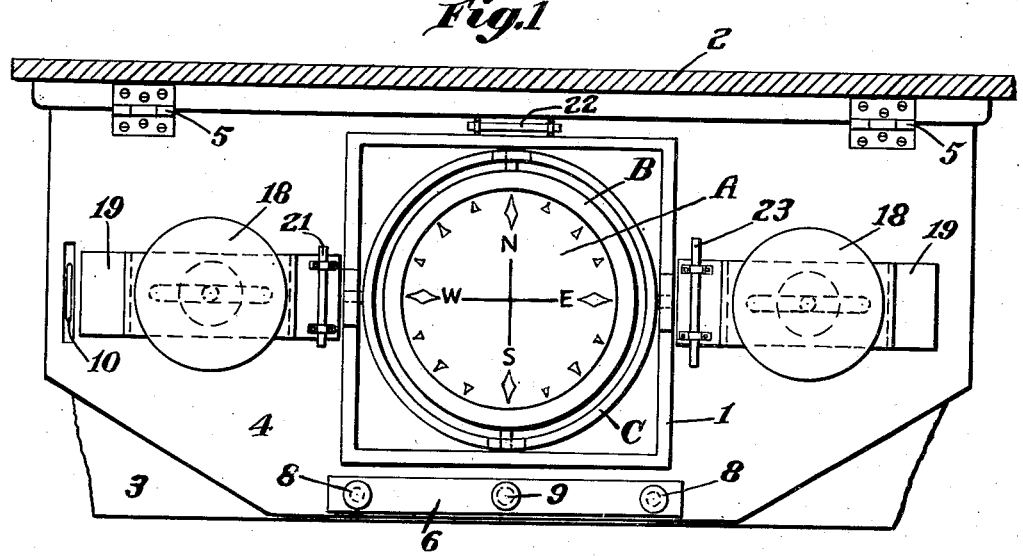
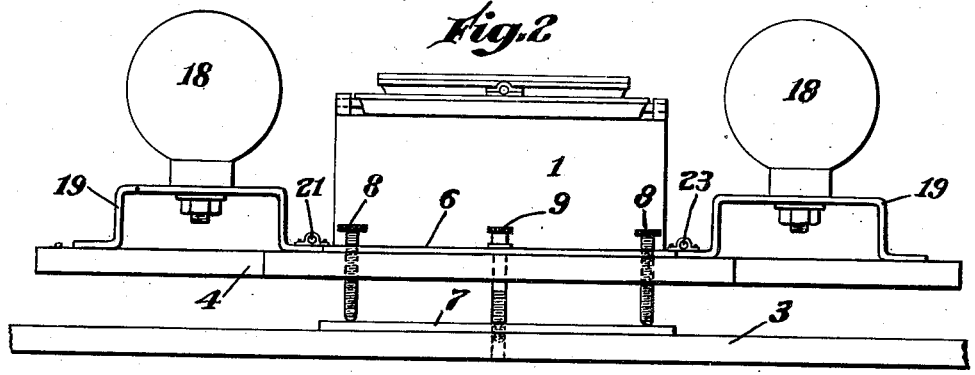
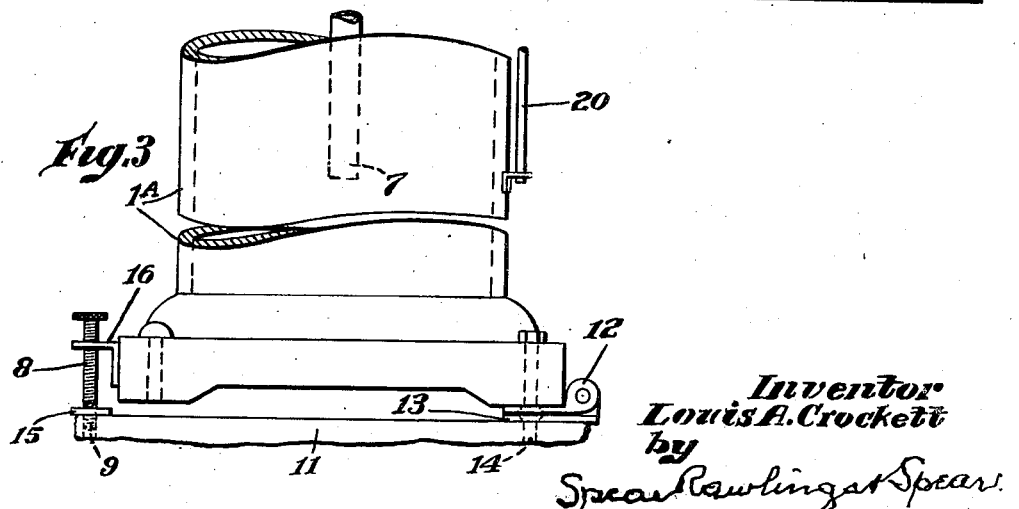
Inventor
Louis A. Crockett
by
Spear Rawlings & Spear
Attorneys Patented June 20, 1939

2,162,939

UNITED STATES PATENT OFFICE 2,162,939

APPARATUS FOR MAINTAINING COMPASS ACCURACY IN MARINE INSTALLATIONS

Louis A. Crockett, Rockland, Maine

Application January 17, 1938, Serial No. 185,304

3 Claims. (Cl. 33—225)

My present invention relates to apparatus for maintaining the magnet system utilized to neutralize the magnetic influence of the ship uninfluential of the compass.

The construction of ships makes inevitable a magnetism effective to destroy compass accuracy and necessitates skilled correction.

Such correction is effected by a corrective magnet system selected by the compass adjuster on the basis of the longitudinal, vertical and unsymmetrical magnetic factors deemed to be determinative of the polarity of the ship and by trial and error of various magnets until proved compasses accuracy is established.

The indicated factors are not the only ones that must be considered for even vessels of apparently identical construction present a distinctly different problem to the compass adjuster. Such other factors as the absence or presence of a charge resulting from construction, the cargo, and the like, are of importance.

While in no case is the above mentioned correction of a compass permanent, great difficulty has been experienced in vessels in which the trim was varied. In vessels in which a change in speed resulted in a change of trim, compass error at different speeds was noted permitting a mental correction if the speed was correctly gauged. With cargo carriers effecting a partial cargo discharge at intermediate ports, such, for example, as tankers, even this remedy was not available with the result that a compass initially correctly tested frequently was in fact seriously inaccurate.

This difficulty has been appreciated by compass adjusters and it has generally been considered to be due to a slight change in the ship's polarity with each change in trim, requiring the substitution of a different corrective magnet system each time.

The acceptance of this as the cause of the difficulty seemed to me major error since any slight change in the polarity of the ship would seem incapable of causing inaccuracy and that it was much more probable the corrective magnets adjacent the compass were dominant in influencing it.

I appreciate that in the art the influence of corrective magnets on the compass on the rolling of the ship has been recognized, but the failure of the suggestions to become available to compass adjusters is doubtless due to the fact that none of the suggestions was effective to avoid the stated source of trouble.

As typical of the suggestions contained in the art, I mention the proposal of mounting the corrective magnets on the bowl of the compass to offset the influence. This suggestion contains theoretical merit since the bowl is supported by gimbals and would, therefore, in theory remain level at all times.

The difficulties presented by this suggestion are many. Because of the individual problem presented by each ship in determining the proper corrective magnets and the fact that periodic inspection may result in a change therein, the corrective magnets cannot be incorporated in the compass structure. Customarily, a supply of magnets is furnished with the compass and when the compass is installed, these magnets are used as required. Only a part of the magnet supply may be used or in certain cases, the compass adjuster must secure additional magnets to secure compass accuracy.

It should also be noted that any weight added to the bowl would require careful balancing to avoid error. Assuming that such magnets could be accurately balanced, compass accuracy would still not result.

The construction of a ship's compass is well known. Invariably, the bowl is supported by gimbal bearings so that it will tend to remain level. The light weight card is floated on a liquid taking most of its weight from its jewelled pivot.

The use of gimbal bearings does not prevent motion of the bowl and the card when the ship rolls or pitches and the motion of the former is noticeably greater than that of the card. As a result, magnets carried by the bowl would have movement relative to the card causing an alternate increase and decrease in effect on the card. As a result, the card would be quite violently turned making the compass extremely inaccurate.

My invention is essentially the reverse of the previously discussed proposal. In accordance with my invention, I utilize a support on which the compass and the corrective magnet system are independently mounted and which support may be quickly and accurately levelled. With the corrective magnet system initially installed with the support levelled and a spirit level instantly recording a change in trim, the precise relation of the magnet system to the compass may be quickly and accurately restored.

While it is true that pitching and rolling has some effect in altering this relation, the effect is no different from that now experienced and is not intensified as in the proposal which I have previously discussed.

It will be noted that the solution of the problem cannot be effected merely by maintaining the compasses and the magnets parallel. It is essential that the compasses and magnets remain in such a relation that a plumb line from the compass card will remain in the same position relative to the magnets at all times because relative fore and aft movement is as effective to cause error as relative vertical movement.

In accordance with my invention, the flinders bar, heeling magnet, and soft iron spheres are maintained perpendicular to the plane of the needle and all corrective magnets parallel to said plane and in the same relation to a plumb line therefrom at all times regardless of the ship's trim.

In the drawing I have illustrated an embodiment of my invention from which its purposes and advantages will be apparent. In the drawing:

Fig. 1 is a plan view of a typical installation of my invention.

Fig. 2 is a front view of Fig. 1, and

Fig. 3 is a fragmentary side view of a modification of my invention.

I have shown at 1 an ordinary compass box which in a typical installation, is located adjacent the wheel (not shown) in the cabin, the front wall of which is suggested at 2. On small craft, the compass is usually of the type shown and is mounted on a shelf or like fixed support 3.

In accordance with my invention, I provide an auxiliary shelf 4 on which the compass box 1 is fixed, which shelf is hinged as at 5 to the wall 2. The auxiliary or hinged shelf 4 and the fixed support 3 are provided with plates 6 and 7 respectively. The plate 6 is threaded to receive adjusting screws 8 and freely receives the clamping screw 9 threaded in the plate 7. A spirit level is indicated at 10 so that by loosening the clamping screw 9, the hinged shelf or support 4 may be quickly and accurately levelled and locked in that position by tightening the clamping screw 9.

In larger vessels, a binnacle is generally used, such as is shown at 1ª in Fig. 3. Such a binnacle in accordance with my invention is secured to the floor 11 by means of a hinge 12, the fixed plate 13 of which is secured to the floor 11 by bolts 14 while the movable plate 12 is attached to the base of the binnacle. A bottom plate 15 is secured to the floor 11 while an angle member 16 is mounted on the base of the binnacle 1ª for the adjusting screws 7 and the clamping screw 9.

The compass card is shown at A in the bowl B supported in the box 1 by the usual gimbal bearings, the gimbal ring of which is designated at C.

Such a compass requires the use of corrective magnets for various purposes. Thus, there is in a typical corrective system the heeling magnet, the flinder's bar, the soft iron correctors or quadrant spheres, and the magnets to neutralize the relatively permanent magnetism of the ship.

Of these, the heeling magnet is indicated at 17. The soft iron correctors are shown at 18 mounted for lateral adjustment relative to the compass in brackets 19, and the flinders bar is shown at 20.

The magnets corrective of the ship's magnetic influence on the compass are shown at 21, 22, and 23. These are indicative of typical correction and these may vary in size or number as required.

Assuming, however, that the magnets 21, 22, and 23 are properly corrective of the magnetic influence of the ship, it will be appreciated that with a change in the trim of the ship, the relation of these magnets to the compass will be slightly altered. For example, and as typical of the change in the relation of the corrective magnet system to the compass card, the center of the magnet 23 will move rearwardly in relation to the compass, one end will be raised, and the other end lowered so that the magnet 23 will be exerting an influence on the compass itself rather than neutralizing the ship's magnetism.

In accordance with my invention compass accuracy may be quickly and accurately re-established by re-leveling the shelf or hinged support 4 which re-establishes the precise relation of the corrective magnets 21, 22, and 23 to the compass.

It is essential to my invention, then, that the corrective magnet system be mounted on the same support on which the compass is mounted. Since the compass card remains level, re-leveling the support on changes in trim will restore the original relationship of the magnets and the compass card.

What I therefore claim and desire to secure by Letters Patent is:

1. In a ship's compass installation, a magnetic compass, a support for said compass, means universally supporting said compass upon said support, magnetic means carried by said support to correct the magnetic influence of the ship on said compass, a hinge connecting one end of said support to a desired part of the ship for movement about an athwartship axis only and holding said support against lateral inclination relative to said ship, and adjustable means connecting the opposite end of said support to said desired part of the ship to pivot said support about said axis on changes in trim to prevent changes in influence of said magnetic means upon said compass.

2. In a ship's compass installation, a magnetic compass, a support for said compass, means universally supporting said compass upon said support, magnetic means carried by said support to correct the magnetic influence of the ship on said compass, said support at one end being pivotally connected to a desired part of the ship for movement about an athwartship axis only and held against lateral inclination relative to said ship, and at its opposite end being adjustably connected to some desired part of the ship to pivot said support about said axis on changes in trim to prevent changes in influence of said magnetic means upon said compass.

3. In a ship's compass installation, a magnetic compass, a support for said compass, means universally supporting said compass upon said support, magnetic means carried by said support to correct the magnetic influence of the ship on said compass, said support being pivotally mounted at one end on said ship for movement about an athwartship axis only and held against lateral inclination relative to said ship, and means for adjusting said support about said axis on changes in trim to prevent changes in influence of said magnetic means upon said compass.

LOUIS A. CROCKETT.